Figure 1:
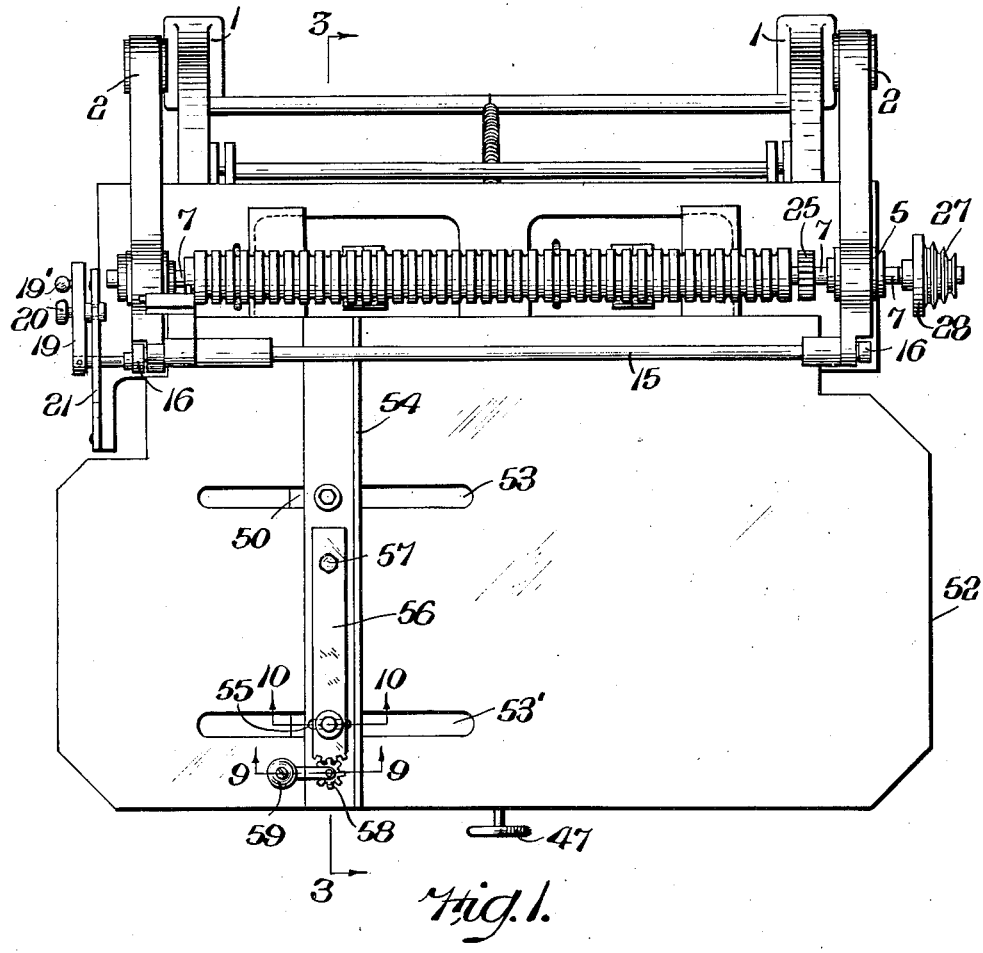

July 28, 1942.  C. A. WRIGHT  2,291,272
SCORING MACHINE
Filed Feb. 4, 1941  3 Sheets-Sheet 1

INVENTOR
CHARLES A. WRIGHT
BY
ATTORNEY

July 28, 1942.   C. A. WRIGHT   2,291,272
SCORING MACHINE
Filed Feb. 4, 1941   3 Sheets-Sheet 3
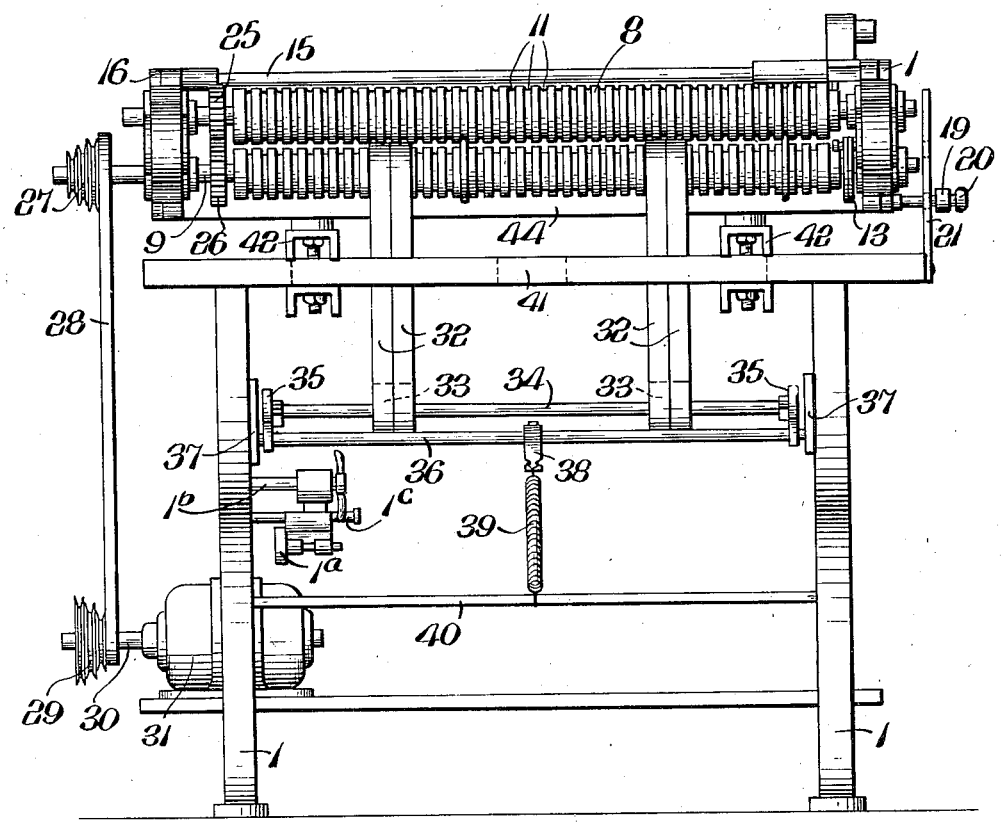
Fig. 4.
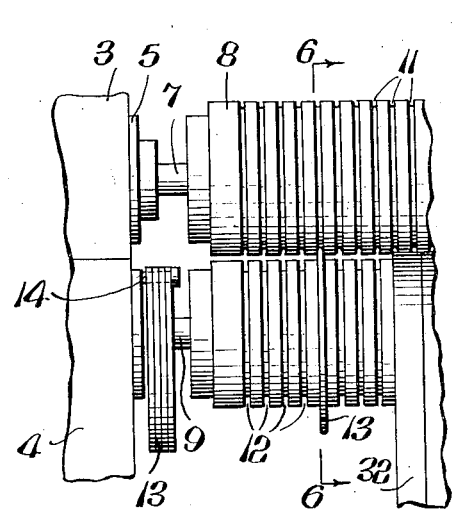
Fig. 5.
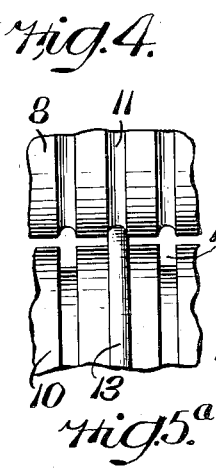
Fig. 5.a
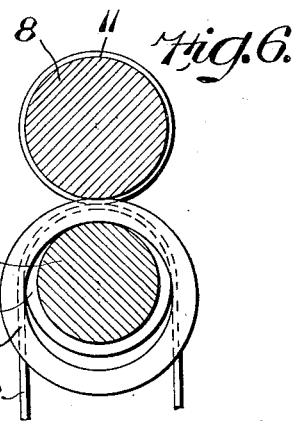
Fig. 6.
INVENTOR
CHARLES A. WRIGHT
BY
ATTORNEY Patented July 28, 1942

2,291,272

UNITED STATES PATENT OFFICE 2,291,272

SCORING MACHINE

Charles A. Wright, Philadelphia, Pa.

Application February 4, 1941, Serial No. 377,300

10 Claims. (Cl. 164—60)

My invention is a machine designed primarily for scoring sheet material but embodying novel features applicable to various apparatuses wherein substantially instantaneous and exact axial adjustability of a series of tools relatively to one another, from close juxtaposition to the maximum capacity of the machine, is desirable.

In accordance with my invention, a tool holder is provided with a series of aligned spaced seats for the reception of one or more tools slidable along the holder into the respective seats, and held therein eccentrically to the axis of the holder by a platen movable toward and from the holder. The work to be acted upon by the tools is moved between the holder and platen by a suitable work carrier, beneath which the tools are movable by retracting the platen and slackening the work carrier.

In the preferred embodiment of my invention in a scoring machine, the tool holder consists of a cylindrical roller containing a series of circumferential grooves spaced axially from one another, preferably uniformly and proportionately to the desired minimum distance between the scores to be formed. The scoring tools consist of annular blades or rings which, when idle, are moved to an end of the roller, and which preferably make a loose slip fit with the projecting roller sections between the grooves and are freely movable axially along the roller into registration with grooves having any desired relative spacing and into which they fit for use. The platen consists of a cylindrical roller preferably containing grooves complementary to, but which may be shallower than, the grooves in the tool holder and into which platen-grooves the seated blades or rings project when the platen roller and tool holding roller are so juxtaposed as to hold the rings eccentrically to the axis of the tool holding roller.

The work carrier preferably comprises one or more belts looped over one of the above complementary rollers (preferably the tool holder) and over an idler or idlers movable into position to slacken the belts, and permit axial movements of the tools thereunder along the tool holder, and into position to tauten the belts for feeding sheet material to tools or blades in roller grooves on either side of or between the belts. The belts are of such thickness and compressibility as to contact the platen roller when the latter is in blade-securing position and the belts are tautened and provide a movable cushioned support giving traction to the work as the latter advances between the belts and the platen.

The sheet material being fed is preferably directed toward the work carrier by an adjustable guide movable rectilineally along and angularly to a work supporting table adjacent to the rollers.

My invention provides a machine by which sheet material may be creased, ribbed, perforated, slit or otherwise scored along any desired number of parallel lines of uniform or widely varied spacing. The positions of the scoring tools may be easily, rapidly and accurately adjusted without loosening any collars, bolts or other fastenings and without the use of wrenches, screwdrivers or other tools. Moreover the complementary relievo and intaglio scoring elements formed by the eccentrically seated blades and platen grooves always accurately register with one another so that perfect creases and ribs may be formed on opposite sides of the sheet material.

The characteristics and advantages of my improvements will further appear from the following description and the accompanying drawings in illustration thereof.

Figure 2:
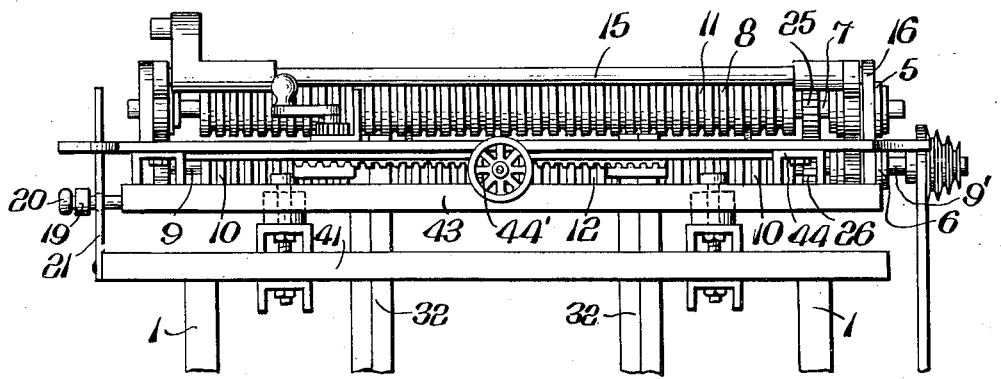
Figure 3:
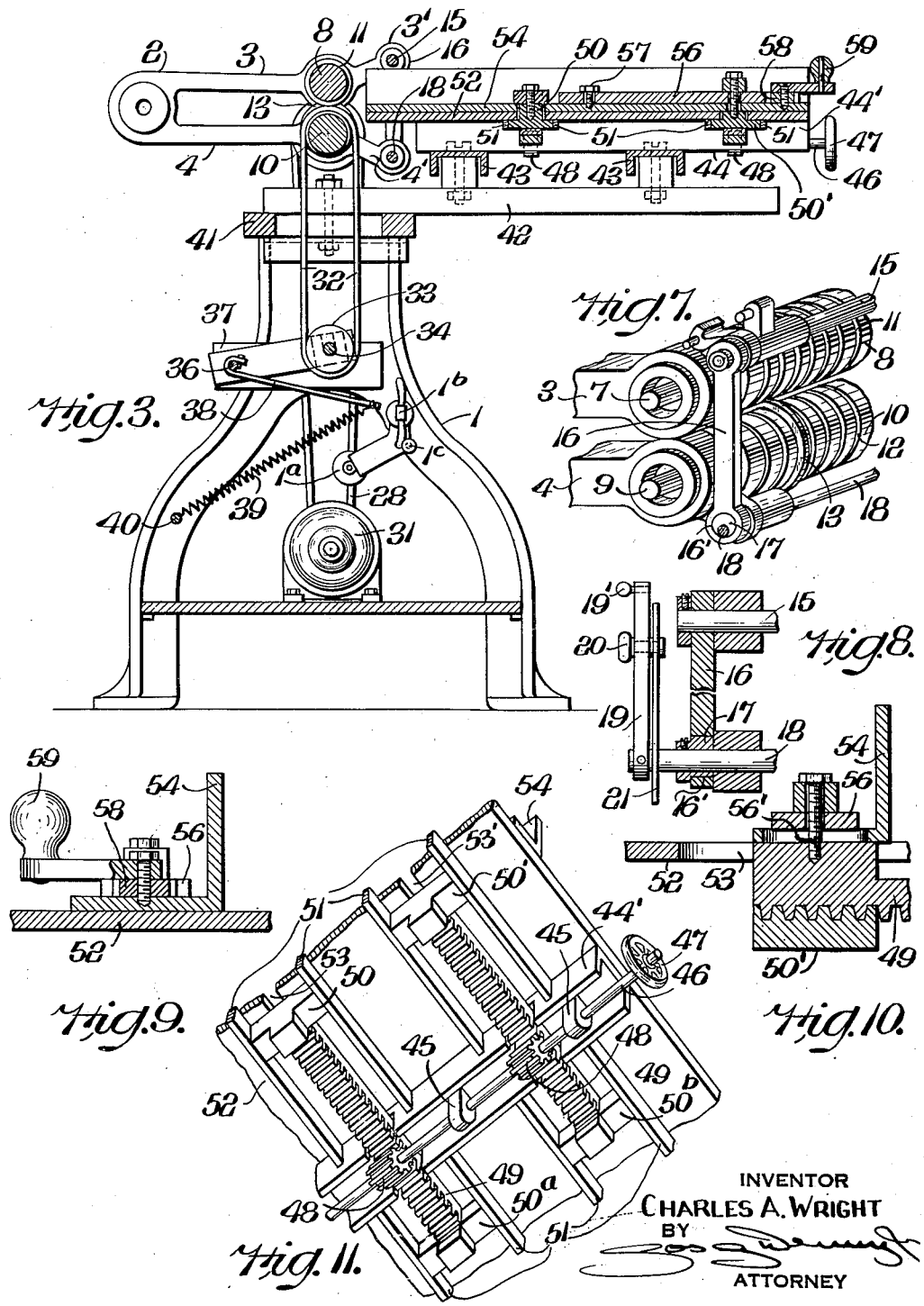

In the drawings, Fig. 1 is a top plan view of a sheet scoring machine embodying my invention; Fig. 2 is a front elevation of the upper part of the machine shown in Fig. 1; Fig. 3 is a transverse, sectional view taken on the line 3—3 of Fig. 1; Fig. 4 is a rear elevation of the machine; Fig. 5 is an enlarged fragmentary front elevation of the left hand end of the rollers shown in Fig. 2 with an annular scoring blade in a scoring position and idle annular scoring blades in inactive position; Fig. 5a is a greatly enlarged fragmentary view of the rollers and a ring showing how the edges of the blade and platen groove may be rounded for creasing; Fig. 6 is a transverse sectional view on the line 6—6 of Fig. 5; Fig. 7 is a fragmentary perspective view of eccentric mechanism for moving the bearings of the rollers toward and from one another; Fig. 8 is a fragmentary sectional view of details of the eccentric mechanism; Fig. 9 is an enlarged transverse sectional view on the line 9—9 of Fig. 1; Fig. 10 is an enlarged transverse sectional view on the line 10—10 of Fig. 1; and Fig. 11 is a perspective bottom view of the feed table and the carriage for the sheet guide.

In the embodiment of my invention illustrated in the drawings, the end frames 1 have fixed thereto respectively the cast iron yokes 2 comprising upper arms 3 and lower arms 4 having enlarged ends forming seats for anti-friction bearings 5 and 6 (Figs. 1 and 2). The spaced upper anti-friction bearings 5 have journalled therein end trunnions 7 of an upper roller 8, and the spaced lower anti-friction bearings 6 have journalled therein end trunnions 9 of a lower roller 10 having its axis parallel to the axis of the roller 8 (Figs. 2 and 3).

The upper roller 8 has its surface circumferentially grooved from end to end to form a series of shallow circumferential slots or seats 11 axially spaced a short distance, say, for example, one-eighth inch apart. When the apparatus is designed for creasing and ribbing only, as distinguished from cutting, the grooves are preferably slightly rounded in cross section, as shown in Fig. 5a, to prevent the formation of sharp edges and avoid cutting the sheet material being creased and ribbed.

The lower roller 10 contains a similar series of circumferential grooves or seats 12 complementary to the grooves or seats 11, but preferably somewhat deeper than the latter.

A series of annular blades or rings 13 are sleeved on the roller 12 and, when not in active use, may be suspended from a fixed bracket 14 supported by the arm 4. The rings 13 contain an opening having an internal diameter larger than the external diameter of the portions of the roller 10 between the grooves 12. Preferably the rings 13 make a fairly close slip fit with the roller when they are detached from the hanger 14 and moved axially along the roller 10. The axial thickness of the rings 13 is slightly less than the axial width of the grooves 11 and 12, so that when a ring 13 is brought into registration with groove 12 it may be moved transversely to its axis, and when the ring is forced to the bottom of a groove on one side of the roller it projects eccentrically from the roller on the other side thereof as illustrated in Fig. 6.

The seated ring or rings 13 are held against dislodgement from the seat or seats 12 by moving the rollers 8 and 10 toward one another so that the peripheries of the seated ring or rings project into and are housed by the complementary seats or grooves 11 in the roller 8. The radial width of the rim of a ring is preferably greater than the sum of the depths of a seat 11 and a seat 12 so as to leave a space between the rollers when the ring is seated in the grooves of both rollers.

The relative positioning of the rollers 8 and 10 to permit or to prevent axial shifting of the rings 13 along the roller 10 may be effected in any desirable manner. Preferably the cast iron yokes 2 are so shaped that, when they are unsprung, the rollers 8 and 10 are sufficiently spaced from one another to permit free axial movement of the rings 13 along the roller 12. The yokes have, however, sufficient springiness to permit the rollers to be biased toward one another. Such biasing may be conveniently effected by journalling in the forward extensions 3' of the upper arms 3 (Fig. 3), a shaft 15, on the outer ends of which are pivotally hung the links 16 (Figs. 7 and 8). The lower ends of these links contain circular seats 16' for circular cams 17 eccentrically fixed on a shaft 18 which is journalled in bearings in the extensions 4' of the lower arms 4. The shaft 18 is rotatable through a radial arm 19 (Figs. 1, 2, 4 and 8) fixed thereto and having a handle 19' for its manual manipulation, and a thumb screw 20 by which the arm 19 may be locked to a segmentally slotted plate 21 mounted on the frame.

To effect the rotation of the rollers, one of the trunnions 7 of the roller 8 has fixed thereto a pinion 25 which meshes with a complementary pinion 26 fixed to a trunnion 9 of the roller 10, and an extension 9' of the trunnion 9 (projecting beyond the bearing 6) has fixed thereto a pulley 27 driven through a belt 28, pulley 29 and shaft 30 from an electric motor 31 mounted on the frame.

A series of rubber belts 32 are looped over the lower roller 10 and over an idler roller comprising pulleys 33 mounted on, and axially adjustable along, a shaft 34 journalled in the arms 35. The latter are fixed on a shaft 36 journalled in brackets 37 on the frame and normally biased in one direction by an arm 38 and coiled spring 39 fixed to the rod 40 mounted on the frame (Fig. 3).

A lifter 1a is pivoted on the stub shaft 1b on the frame and may be rocked into engagement with a bearing on the bracket 35 to lift it and the shaft 34 and the pulleys 33 to slacken the belts 32. A stop 1c on the frame limits the downward movement of the lifter.

A platform 41, supported on the frame ends 1 (Fig. 3), has adjustably mounted thereon the transversely extending channel cantilever arms 42 which support the channel stringers 43, on which are mounted the channel cross pieces 44 and 44' (Fig. 2).

The channel 44' contains bearings 45 in which is journalled a shaft 46 having thereon a hand wheel 47 and the pinions 48 meshing with racks 49. The racks pass through recesses in the walls of the channel 44' and have fixed to the ends thereof the slides 50, 50', 50a and 50b which slide in the slideways 51 on the underside of a slotted table 52 (Fig. 11). The table 52 rests on the channels 44 and 44'.

The slide 50 has a hub projecting upwardly therefrom through a slot 53 in the table 52 and forming a journal bearing for an oscillatible L-shaped straight edge or guide 54, which may be held against detachment from the hub by a suitable bolt and washer assembly.

A toothed arm 56 is pivotally connected to the guide 54 by a bolt 57 and is pivotally connected with the slide 50' by a bolt 56' which passes freely through an elongated transverse slot 55 in the guide 54.

A pinion 58, pivotally connected with the slide 54, meshes with the toothed end of the arm 56, and may be rocked by a handle 59 to rock the arm 56 on its pivot 57 and therethrough rock the guide 54 on the hub of the slide 50.

In using the apparatus for creasing folders, for instance, the arm 19 is released from the plate 21 by loosening the thumb screw 20. Upon turning the arm 19, the eccentric cams 16' are turned in their seats and permit the elasticity of the cast iron yokes 2 to spread the rolls 8 and 10. The lifter 1a is then rocked to slacken the belts 32.

A sufficient number of rings 13 to make the desired number of creases are then slid along the roller 10, and dropped into such grooves 12 as will position the rings 13 in the relation required to form creases spaced from one another and from the edge of the sheet to be creased to the extent desired. The pulleys 33 and slackened belts 32 are then so positioned axially as to clear the rings 13 and feed work to the rings when the belts are tightened by the spring 39 upon releasing the lifter 1a.

To guide the work accurately to the blades 13 and belts 32, the guide 54 may be shifted along the table 52 axially of the rollers by turning the hand wheel 47 and the guide 54 may be rocked to different angular positions relatively to the rollers by turning the handle 59. The turning of this handle 59 causes the pinion 58 to turn the arm 56 on the bolt 56', to thereby apply a thrust, through the bolt 57, to the guide 54 and turn the latter on its pivot formed by the hub of the slide 50.

It will of course, be understood that the rings 13 may be given various other contours and the platen 8 surfaces made complementary to such contours to effect any desired type of work on the sheet material fed between them. For instance, one or more of the rings may be given a cutting edge to shear the sheet material, or a knurled or embossed edge to imprint the sheet material, or may be provided wtih peripheral punches or piercing devices to perforate the sheet material, or rings for performing various kinds of work may be used in combination at the same time on the roller 10.

Having described my invention, I claim:

1. The combination with a tool holder having a plurality of tool seats encircling the holder, of a tool slidable along the holder into the several seats respectively said tool being movable circumferentially about said holder, and a platen complementary to said tool and holding it in any of said seats.

2. The combination with a roller containing a plurality of circumferential grooves, of a tool comprising a ring slidable along said roller into any of said grooves, a platen complementary to said tool and holding it in any of said grooves, and a work carrier movable between said roller and platen.

3. The combination with a plurality of relatively movable rollers, at least one of which contains a plurality of circumferential ring-seats, of a ring sleeved on and movable axially of one of said rollers from seat to seat when said rollers are spaced apart and held against axial movement in any one of said seats when said rollers are juxtaposed.

4. The combination with a plurality of rollers, at least one of which contains a plurality of circumferential ring seats, of a ring sleeved on said last named roller and having an internal diameter larger than the external diameter of the portions of said roller between seats, said ring being movable axially on said last named roller when the axes of said roller and ring are concentric, any one of said seats being shaped for receiving said ring and having walls preventing axail movement thereof when said ring is eccentrically seated in such seat.

5. The combination with a roller containing a plurality of circumferential ring-seats, of a ring movable axially along said roller into any one of said seats, means for holding said ring in any one of said seats, and a belt looped on said roller and forming a moving support for work fed to said ring.

6. The combination with a pair of rollers each containing a plurality of circumferential ring-seats complementary to seats in the other roller, a ring sleeved on and moved axially along one of said rollers into any one of the seats therein, and a belt running between said rollers for applying traction to work acted upon by said ring.

7. The combination with a plurality of rollers, at least one of which contains a plurality of circumferential ringseats, of a ring sleeved on and movable axially along said last named roller into any one of said seats, a belt looped on said last named roller and another of said rollers, and means for moving said second named roller and a third roller toward and from said seat-containing roller to tighten and slacken said belt and secure said ring in or release it from a seat aforesaid, said belt forming a moving cushioned support applying traction to work between the first two rollers.

8. In apparatus of the character described, a pair of cast iron yokes each having spaced arms, a roller journalled in arms of both yokes, a second roller journalled in other arms of both yokes, a tool on one of said rollers, and cam mechanism connected with said arms for relatively moving said rollers against the elasticity of the cast iron yokes.

9. In apparatus of the character described, a pair of yokes having resilient arms, rollers journalled in said arms, shafts journalled in said arms, links connected with said shafts, one of said shafts having eccentric members through which it is connected with said links, and means for turning said last named shaft to cause said links to move said arms and rollers.

10. In apparatus of the character described, the combination of a pair of rollers containing complementary circumferential grooves; and a ring slidable along one of said rollers and fitting into the grooves thereof; the grooves of the other of said rollers having a cross sectional contour complementary to the cross sectional contour of the peripheral sections of said ring.

CHARLES A. WRIGHT.